United States Patent
Lam et al.

(10) Patent No.: US 7,560,077 B2
(45) Date of Patent: *Jul. 14, 2009

(54) COMPACT CHEMICAL REACTOR WITH REACTOR FRAME

(75) Inventors: Duhane Lam, Vancouver (CA); Olen Vanderleeden, Coquitlam (CA)

(73) Assignee: Angstrom Power Incorporated, North Vancouver (CA)

( * ) Notice: Subject to any disclaimer, the term of this patent is extended or adjusted under 35 U.S.C. 154(b) by 315 days.

This patent is subject to a terminal disclaimer.

(21) Appl. No.: 11/433,014

(22) Filed: May 12, 2006

(65) Prior Publication Data

US 2006/0204411 A1    Sep. 14, 2006

Related U.S. Application Data

(63) Continuation of application No. 10/818,610, filed on Apr. 6, 2004, now Pat. No. 7,063,910.

(51) Int. Cl.
  *B01J 10/00* (2006.01)
  *H01M 8/02* (2006.01)
  *H01M 8/24* (2006.01)
(52) U.S. Cl. ............... 422/129; 422/100; 422/103; 422/104; 422/130; 422/193; 422/197; 429/34; 429/35; 429/36; 429/37; 429/38; 429/40
(58) Field of Classification Search ........... 422/129, 422/193, 130, 100, 103, 104, 197; 429/34, 429/35, 36, 37, 38, 40
See application file for complete search history.

(56) References Cited

U.S. PATENT DOCUMENTS 3,634,140 A    1/1972    Von Krusenstierna (Continued)

FOREIGN PATENT DOCUMENTS

CA    2273316    11/1999

(Continued)

OTHER PUBLICATIONS

Wainwright, et al., "A Microfabricated Hydrogen/Air Fuel Cell", *195 Meeting of the Electrochemical Society*, Seattle, WA, (1999).

*Primary Examiner*—Walter D Griffin
*Assistant Examiner*—Huy-Tram Nguyen
(74) *Attorney, Agent, or Firm*—Schwegman, Lundberg & Woessner, P.A.

(57) ABSTRACT

The compact chemical reactor with a central axis includes at least two unit reactors disposed adjacent to each other to form front and back sides of the compact chemical reactor; a front and back reactant plenum communicating with the front and back side respectively; at least one of the plenums comprises a reactant; and unit reactors comprising: a front cavity between front and back process layers; a back cavity between back and front process layers of adjacent unit reactors; the process layers facilitate transport processes between reactant plenums; each cavity communicates with one side of the compact chemical reactor; a front and back perimeter barrier on the back and front process layers respectfully, substantially surrounding respective cavities. At least one of the unit reactors comprise at least one frame formed from one of the process layers, at least one of the perimeter barriers, and at least one of the cavities.

29 Claims, 14 Drawing Sheets

U.S. PATENT DOCUMENTS

| | | |
|---|---|---|
| 5,252,410 A | 10/1993 | Wilkinson et al. |
| 5,364,711 A | 11/1994 | Yamada et al. |
| 5,480,738 A | 1/1996 | Elangovan et al. |
| 5,508,128 A | 4/1996 | Akagi |
| 5,631,099 A | 5/1997 | Hockaday |
| 5,672,439 A | 9/1997 | Wilkinson et al. |
| 5,759,712 A | 6/1998 | Hockaday |
| 5,861,221 A | 1/1999 | Ledjeff et al. |
| 5,925,477 A | 7/1999 | Ledjeff et al. |
| 5,989,741 A | 11/1999 | Bloomfield et al. |
| 6,060,188 A | 5/2000 | Muthuswamy et al. |
| 6,127,058 A | 10/2000 | Pratt et al. |
| 6,387,557 B1 | 5/2002 | Krasij et al. |
| 6,527,890 B1 * | 3/2003 | Briscoe et al. ............ 156/89.11 |
| 6,620,542 B2 | 9/2003 | Pan |
| 6,729,352 B2 * | 5/2004 | O'Connor et al. ............ 137/827 |
| 6,732,567 B2 * | 5/2004 | Briscoe et al. ............ 73/23.39 |
| 6,740,444 B2 | 5/2004 | Leban |
| 6,830,736 B1 | 12/2004 | Lamla et al. |
| 6,960,235 B2 * | 11/2005 | Morse et al. ............ 48/127.9 |
| 7,048,897 B1 * | 5/2006 | Koripella et al. ............ 422/198 |
| 7,169,367 B2 * | 1/2007 | Takeyama et al. ............ 422/198 |
| 7,241,525 B2 * | 7/2007 | McLean et al. ............ 429/32 |
| 2004/0050285 A1 | 3/2004 | Zozulya et al. |
| 2006/0204411 A1 | 9/2006 | Lam et al. |

FOREIGN PATENT DOCUMENTS

| | | |
|---|---|---|
| CA | 2396191 | 7/2001 |
| CA | 2438733 | 8/2002 |
| CA | 2484294 | 11/2003 |
| EP | 0585049 A1 | 3/1994 |
| EP | 0823743 A2 | 2/1998 |
| GB | 2339058 | 1/2000 |
| JP | 8-50903 | 2/1996 |
| WO | WO-0195406 A2 | 12/2001 |
| WO | WO-02067345 A2 | 8/2002 |
| WO | WO-02099917 A2 | 12/2002 |

* cited by examiner

COMPACT CHEMICAL REACTOR WITH REACTOR FRAME

CROSS-REFERENCE TO RELATED APPLICATION

This application is a continuation of U.S. patent application Ser. No. 10/818,610, filed on Apr. 6, 2004, now U.S. Pat No. 7,063,910 the specification of which is incorporated herein by reference.

FIELD

The present embodiments relate to a compact chemical reactor made of one or more unit reactors, wherein at least one unit reactor has at least one reactor frame.

BACKGROUND

Layered, planar chemical reactors can be used for many tasks. One major problem with the layered planar chemical reactor is that the layers must be held in intimate electrical contact with each other. If the intimate contact does not occur, the internal resistance of the stack increases causing the overall efficiency of the chemical reactor to decrease.

A second problem with the layered planar chemical reactors is that larger surface areas increase the difficultly of maintaining consistent contact with the inner recesses of the layered planar chemical reactor.

Since both reactants are required to flow within the plane of the layered planar chemical reactor, at least four and up to six distinct layers have been required to form a workable cell. These layers are usually manufactured into two separate chemical reactors components. A chemical reactor stack is, then, formed by bringing layers into contact with each other. In forming the chemical reactor stack by contacting the layers, reactant flow must be allowed within the layers, but reactants must not be allowed to leak from the assembled chemical reactor stack. The assembled stack usually has to be clamped together with significant force in order to activate perimeter seals and reduce losses associated with transport processes inherent in the reaction. Compressing layers together using brute force is inefficient and expensive.

A need has existed for a small compact chemical reactor capable of low cost manufacturing with fewer parts than the layered planar structure chemical reactor.

A need has existed for a compact chemical reactor with frames capable of being scaled to micro-dimensions, to reduce leakage and manufacturing costs.

A need has existed for a chemical reactor without the external components for connecting the unit reactors together. A need has existed for a compact chemical reactor with high aspect ratio cavities.

A need has existed for a chemical reactor topology or a chemical reactor architecture that allows increased active areas to be included in the same volume, i.e. higher density of active areas. The present embodiments meet these needs.

SUMMARY

The compact chemical reactor with a central axis has at least a first unit reactor and a second unit reactor. The first and second unit reactors are disposed adjacent each other to form a front side and a back side of the compact chemical reactor. The reactor also includes a front reactant plenum communicating with the front side and a back reactant plenum communicating with the back side. At least one of the reactant plenums comprises a reactant.

The unit reactors comprise a front process layer, a back process layer, a front cavity formed between the front and back process layers, a back cavity formed between the back process layers and the front process layer of adjacent unit reactors, a front perimeter barrier disposed on the back process layer substantially surrounding the back cavity; and a back perimeter barrier disposed on the front process layer substantially surrounding the front cavity. The front cavity is in communication with the front side and the back cavity is in communication with the back side and wherein at least one of process layers facilitates a transport process between the reactant plenums. At least one of the unit reactors comprise at least one frame formed from one of the process layers, at least one of the perimeter barriers, and at least one of the cavities. Each cavity is in communication with one side of the compact chemical reactor and the process layer facilitates a transport process between the reactant plenums.

BRIEF DESCRIPTION OF THE DRAWINGS

In the detailed description of the preferred embodiments presented below, reference is made to the accompanying drawings, in which.

The present embodiments are detailed below with reference to the listed Figures.

DETAILED DESCRIPTION OF THE PREFERRED EMBODIMENTS

Before explaining the present embodiments in detail, it is to be understood that the embodiments are not limited to the particular descriptions and that it can be practiced or carried out in various ways.

The benefits of the current compact chemical reactor include providing increased reactant surface areas as compared to other compact chemical reactors. The compact chemical reactor also provides an ability to scale a compact chemical reactor to micro-dimensions and create micro-reactors.

The compact chemical reactor was designed to enable users to scale up the compact chemical reactor to larger sizes without the need for external components to hold the compact chemical reactor together.

The use of frames in the compact chemical reactor simplifies the overall design, reduces the number of components needed in construction which simplifies the construction steps needed to make the device. The frame construction also increases the precision of alignment between process layers and perimeter barriers used in the unit reactors.

When composite frames are used, the frame based design simplifies the task of sealing layers by only having to bond similar materials to each other.

Figure 1:
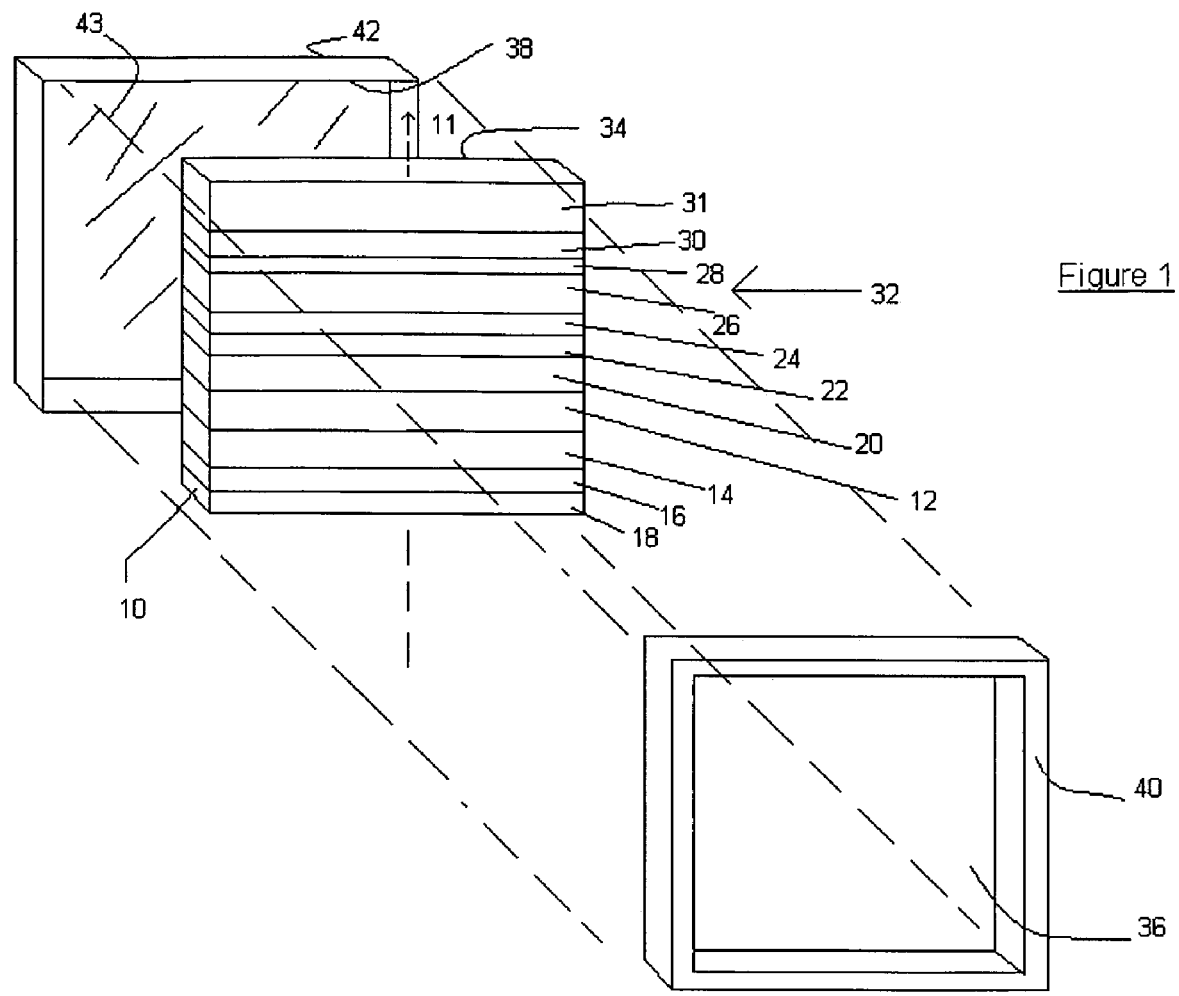
FIG. 1 depicts a perspective view of a flat construction of a chemical reactor with frames.

With reference to the figures, FIG. 1 depicts a perspective view of a flat construction of a chemical reactor (10) with unit reactors constructed using frames.

Figure 2:
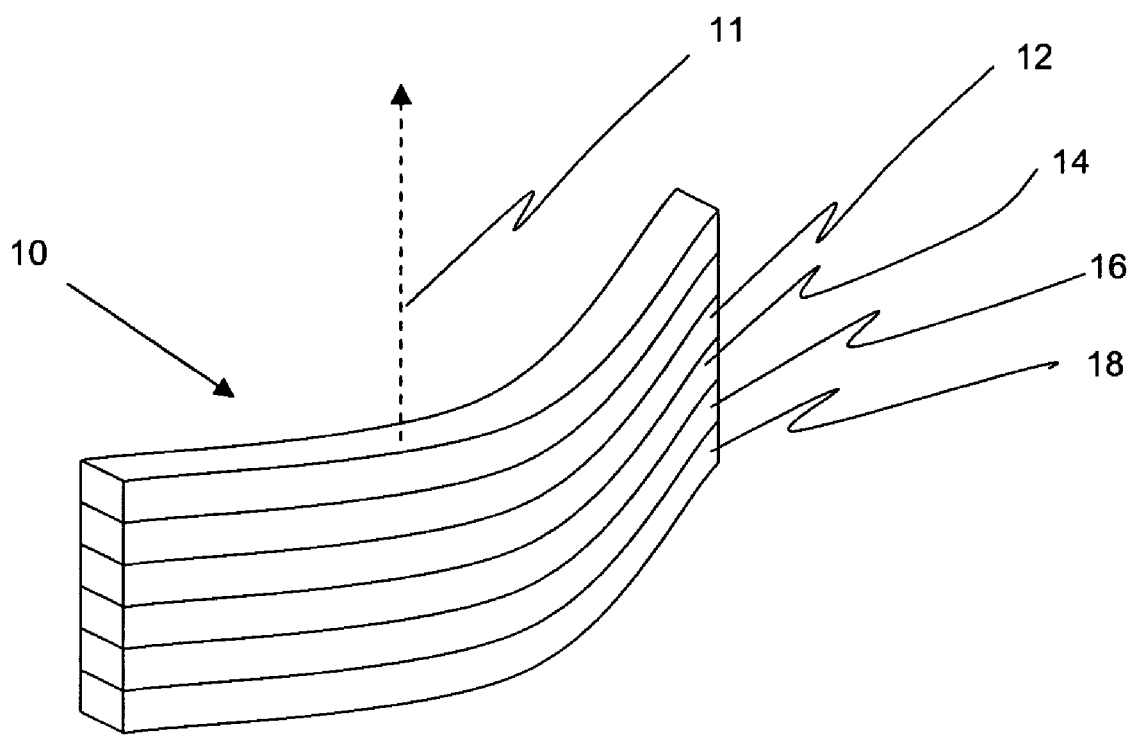
FIG. 2 depicts a thin curvilinear embodiment of FIG. 1.

FIG. 2 depicts a thin curvilinear embodiment of the compact chemical reactor (10). Throughout the figures, the compact chemical reactor (10) is depicted having a central axis (11).

FIG. 1 shows ten unit reactors assembled together having an overall dimension of between about 1 centimeter and 10 centimeters in length, between about 5 millimeters and 80 millimeters in width, and between about 100 nanometers and 4 millimeters in thickness. Each unit reactor, as depicted, has two process layers.

Other shapes besides a cylindrical shape can be used. As an alternative to embodiments depicted in FIG. 1 and FIG. 2, the compact chemical reactor (10) can be a rectangle, a square, a triangle, an octagon, a pentagon, other prismatic shapes, or another irregular shapes.

The compact reactor (10) can have a variable thickness. Variable thickness can mean that one individual unit reactor can be thicker than an adjacent unit reactor.

FIG. 1 in particular shows a compact chemical reactor with eleven unit reactors connected together. In particular, FIG. 1 depicts the first unit reactor (12), a second unit reactor (14) and nine other unit reactors (16, 18, 20, 22, 24, 26, 28, 30, and 31).

The first and second unit reactors are disposed adjacent to each other and form a front side (32) and a back side (34) of the compact chemical reactor. The front side (32) communicates with front reactant plenum (36) and the back side (34) communicates with back reactant plenum (38). The unit reactors can be oriented to form the back reactant plenum (38).

In the embodiment depicted in FIG. 1, the unit reactors are disposed roughly parallel to each other and then the unit reactors are disposed horizontally around the central axis (11).

The front reactant plenum (36) is enclosed by a structure (40). The structure can either be a closed container or open to ambient atmosphere. FIG. 1 depicts an embodiment of the structure (40) open to ambient atmosphere. When the front reactant plenum is open to the atmosphere, the enclosing structure (40) is optional. The structure (40), when open to the atmosphere, adds structural support to the front reactant plenum.

The back reactant plenum (38) is enclosed by a device (42) which is similar to structure (40). The device (42) can be a closed container or open to ambient atmosphere. When the device (42) is open to the atmosphere, it adds structural support to the back reactant plenum. FIG. 1 depicts an embodiment wherein the device (42) is a closed container with a solid back wall (43).

The compact chemical reactor (10) is constructed of a plurality of unit reactors. The design of the compact chemical reactor (10) can range from 2 unit reactors to 50,000 or more unit reactors to be adjoined to create the compact chemical reactor. Preferably, between 2 unit reactors and 500 unit reactors are used in the compact chemical reactor with a preferred embodiment of between 2 unit reactors and 100 unit reactors.

Figure 3:
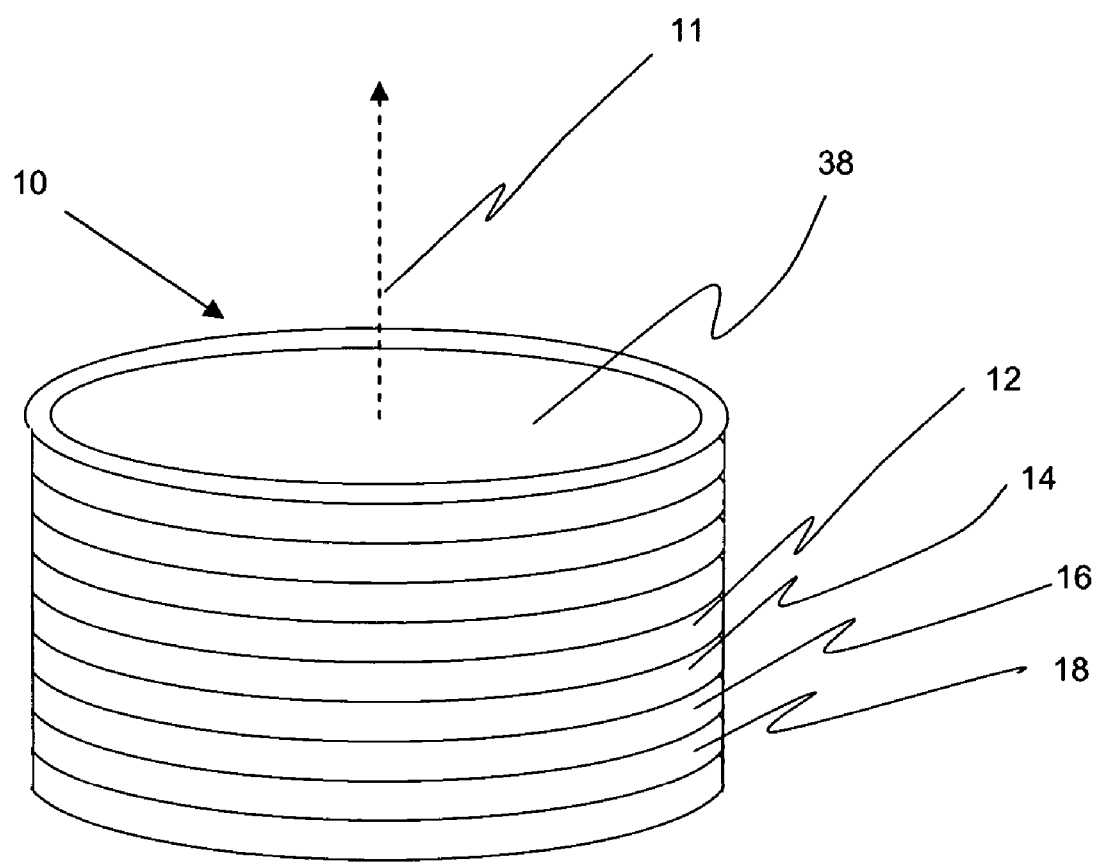
FIG. 3 depicts a view of a chemical reactor with unit reactors perpendicular to the reactors central axis.

FIG. 3 depicts an embodiment where at least one unit reactor (12) is perpendicular to the central axis (11) of the compact chemical reactor (10).

Figure 4:
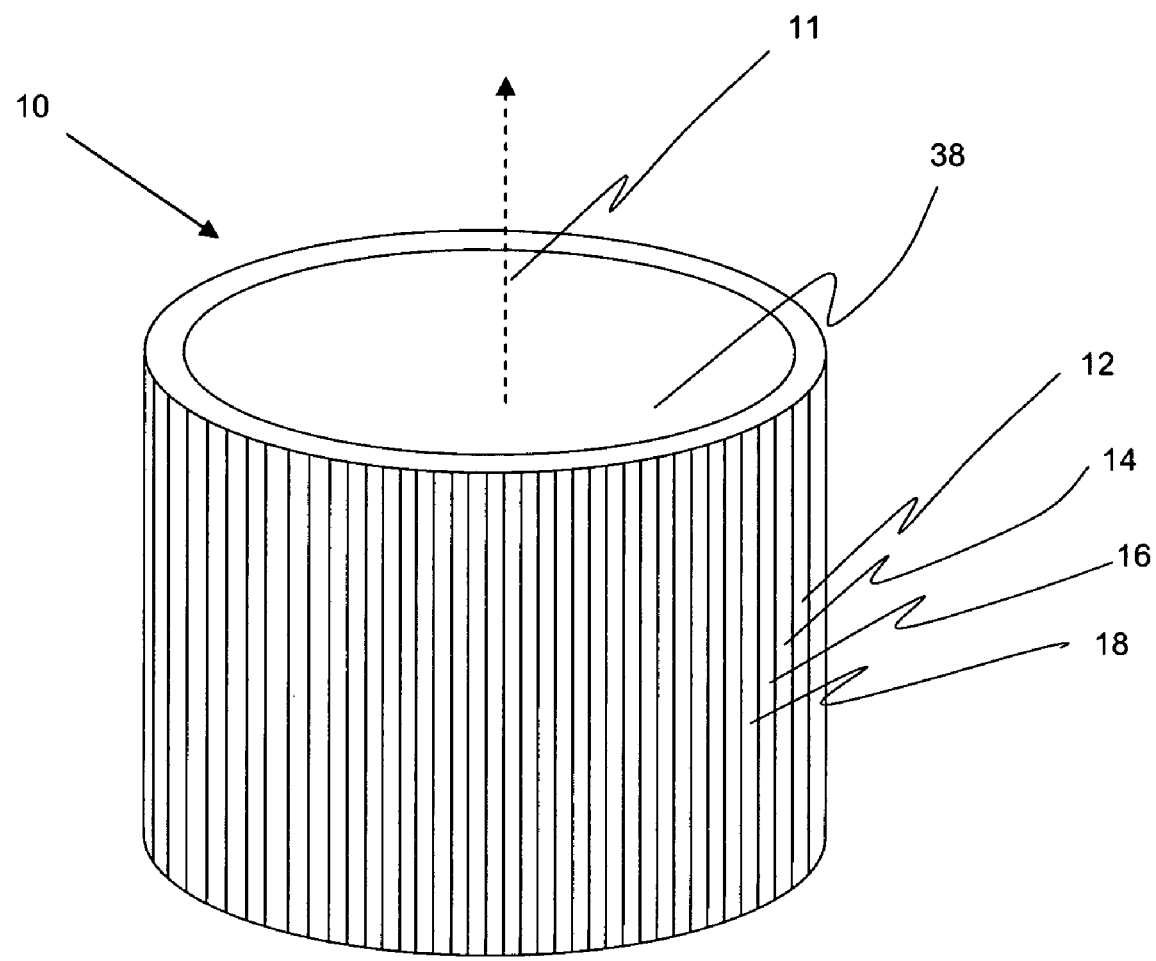
FIG. 4 depicts a cylindrical version of FIG. 1.

FIG. 4 depicts an embodiment wherein at least one unit reactor encloses the back reactant plenum (38) and the unit reactors are disposed roughly parallel to each other and then the unit reactors are disposed parallel around the central axis (11).

An alternative embodiment contemplates the unit reactors disposed parallel to each other orthogonal around the central axis.

Figure 5:
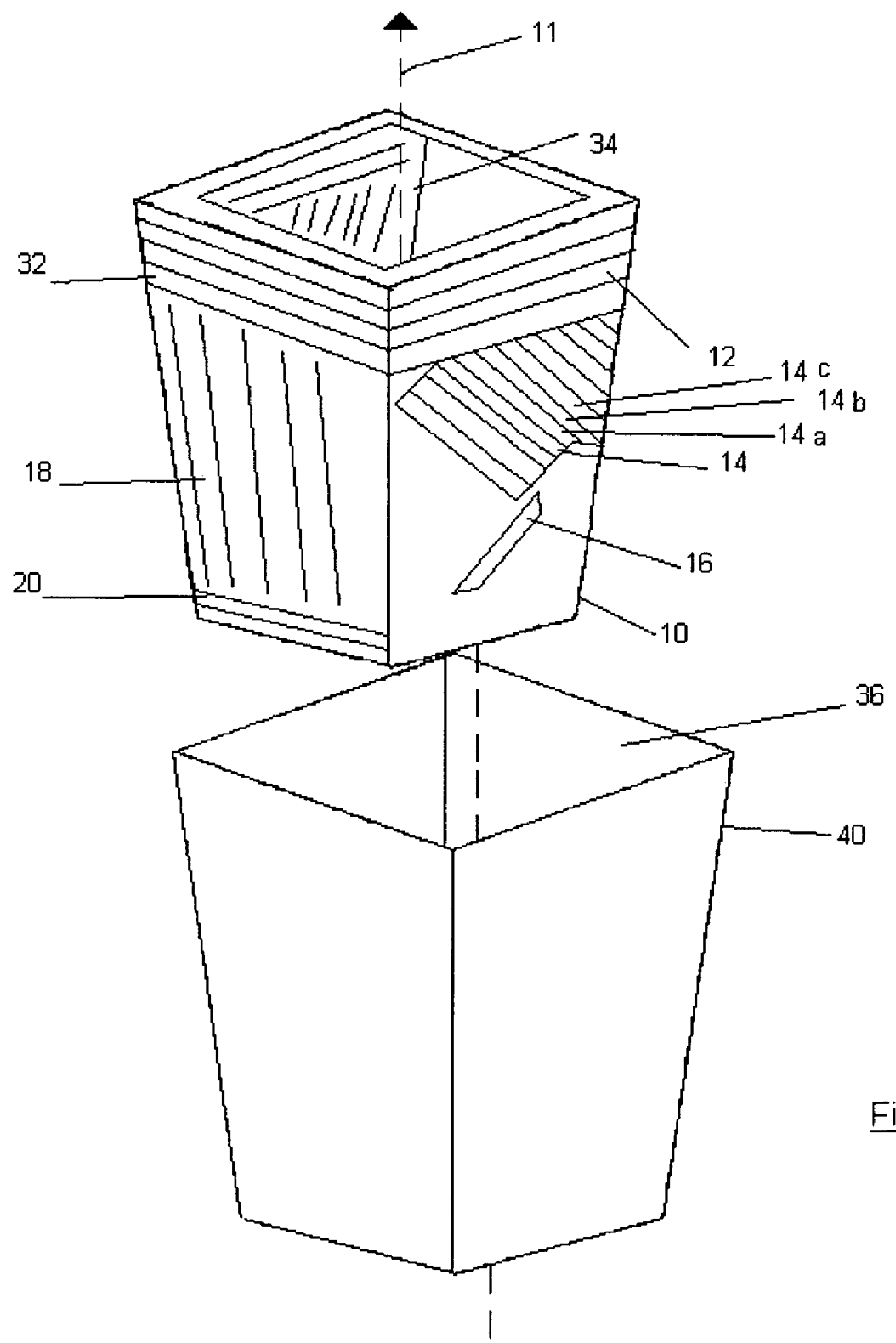
FIG. 5 depicts a view of the chemical reactor of FIG. 1 with unit reactors at angles arbitrary to other unit reactors.

FIG. 5 depicts an embodiment wherein the unit reactors (12, 14, 16, and 18) are disposed roughly parallel to each other but at an arbitrary angle to the central axis (11) of the compact chemical reactor (10). The unit reactors can be disposed in groups wherein the unit reactors are parallel to each other, and then each group can be disposed at an arbitrary angle to adjacent groups.

Figure 6:
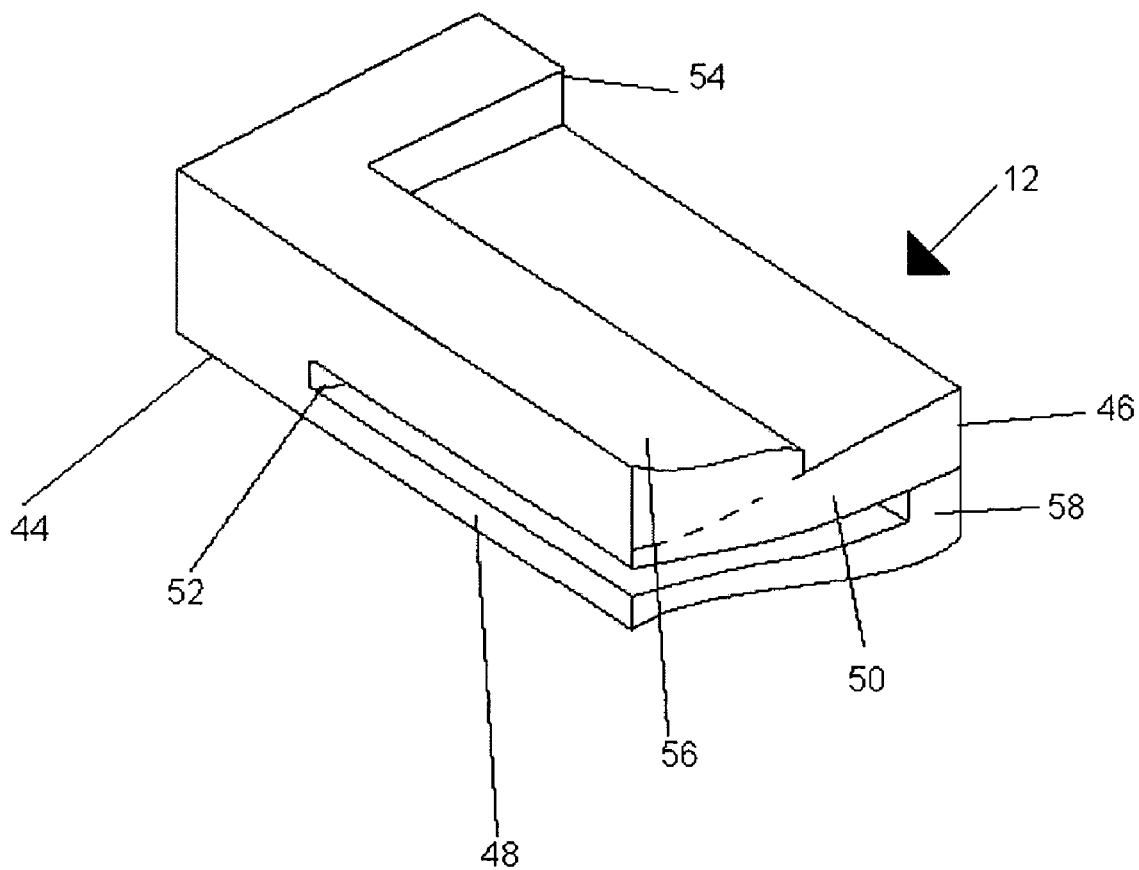
FIG. 6 depicts an individual unit reactor.

FIG. 6 depicts a cutaway perspective view of one embodiment of an individual unit reactor (12). The unit reactor comprises a front process layer (48) and a back process layer (50). The process layers (48 and 50) are shown in this embodiment as thin sheets with each process layer having, preferably, a thickness between about 1 nanometer to about 2 centimeters. As an alternative, the one or more of the process layers can have a thickness different from another process layer.

The thin sheets can be made from one of a variety of materials. For example, process layer material could be an electrolyte, an ion exchange membrane, a filtration membrane, a separation membrane, a micro-structured diffusion mixer, a heater, a catalyst, an electrical conductor, a thermal conductor, and combinations of these. For example, a workable ion exchange membrane would be Nafion™ available from E.I. DuPont DeNamours of Wilmington, Del.

Another usable separation membrane is Nafion™. A micro-structured diffusion mixer is available from Micronics of Seattle, Wash., and typically serves to allow transport of liquid from one cavity to another by diffusion without use of a separation membrane. Micro-structured diffusion mixers have small channels, and when liquid is pushed through the channels, there is a laminar flow. Typically, the micro-structured diffusion mixers are used for blood testing to prevent the mixing of blood with the test liquid but permit diffusion from one liquid to another.

A type of heater usable with the reactors is a thin film resistive heater, such as those available from Omega of Stamford, Conn. Catalysts that are contemplated as useable include inorganic carbon catalysts, such as Novacarb™ from Mast Carbon of the United Kingdom. An electrical conductor that is contemplated for use in the reactors would be a thin film of metal, such as copper or a silver filled epoxy such as model number TF12202 of Tech Film of Peabody, Mass.

Usable thermal conductors can be metals, such as thermally conductive epoxy adhesive films such as those also available from Tech Film.

Alternatively, each process layer can be made of a filled metal composite, a filled microstructure of polymer, filled epoxy composite, graphite composite, or combinations of these materials. Filled metal composites would be a stainless steel filled with carbon, such as those available from Angstrom Power Inc. of Vancouver, Canada. Filled microstructures of polymers include Primea™ membrane available from Gore Industries of Elkton, Md. Filled epoxy composites include those available from Tech Film of Peabody, Mass. Graphite composites include Grafoil™ available from Graftek from Wilmington, Del.

The compact chemical reactor can have a first process layer that performs a different process from the second process layer.

FIG. 6 shows each individual unit reactor having a front cavity (52) and a back cavity (54). The cavities (52 and 54) are formed between the front and back process layers (48 and 50). Each individual unit reactor includes a front perimeter barrier (56) and a back perimeter barrier (58). The front perimeter barrier (56) is located on the back process layer (50) substantially surrounding the back cavity (54). The front perimeter barrier (56) can optionally completely enclose the back cavity (54). Likewise, the back perimeter barrier (58) can be located on the front process layer (48) substantially surrounding the front cavity (52). The back perimeter barrier (58) can optionally completely enclose the front cavity (52).

The perimeter barriers ensure that reactant from one reactant plenum which connects to one of the cavities, does not migrate into another reactant plenum that connects to the other cavity.

The perimeter barriers keep the reactant from migrating by either the material itself or the form of the perimeter barrier, or both form and material. Usable materials for the perimeter barriers can include metals, such as stainless steel; silicone, such as RTV™ available from Dow Corning of Midland, Mich.; rubber, such as those available from the Apple Rubber of Lancaster, N.Y.; polyamide, such as nylon available from DuPont of Wilmington, Del.; synthetic rubber, such as BUNA available from Dow Synthetic Rubber of Edegem Belgium; epoxy, such as those available from EPO Tech of Billerica, Mass.; polytetrafluoroethylene, also available as Teflon™; polyvinyldiflouride, known as Kynar™, available from Atofina Chemicals, Incorporated, of Philadelphia, Pa.; or composites thereof, laminates thereof, alloys thereof, and/or blends of these materials.

Usable forms for the perimeter barriers include microstructures or three-dimensional structures that create a tortuous path for the reactant.

The formed first and second cavities (52 and 54) allow the reactants to move from the plenums to the process layers. In a preferred embodiment, the only transport mechanism for the movement of reactants within the cavities is by diffusion. In an alternative embodiment, the diffusion can be aided by other transport mechanisms including convection and forced flow. The cavities can be filled with material or structured to aid in the distribution of reactants to the process layers. One or more of the cavities can be filled partially, or completely filled, with a material to aid in the transport of reactant, by-product of the reaction caused by the reactants, or transport of attributes of the reactant. The cavity can be filled with a catalyst to promote the function of the compact chemical reactor. A porous media, such as those available from Angstrom Power of Vancouver, Canada, can be used to partially or completely fill the cavities. In a preferred embodiment, the cavity is filled 100% with the porous media. The cavity can be filled with as little as 5% the porous media.

The transport process is the exchange of a reactant or property of a reactant between the reactant plenums. Examples of usable reactants include fuels, water, oxidants, beverages, liquid phase hydrocarbons, gas phase hydrocarbons, foodstuffs, by-products of the reaction and combinations of these materials. Fuels that could be used include hydrogen, hydrogen from reformate, ammonia, sodium borohydride or other chemical hydrides. Oxidants that could be used include oxygen, air, or means of generating oxygen such as hydrogen peroxide. Beverages that could be used as reactants include wine, juices, and other liquids with particulate. Liquid phase hydrocarbons that can serve as reactants include methanol, ethanol, butanol, and formic acid. Gas phase hydrocarbons include propane, butane, methane, and combinations of these. Foodstuffs that are usable include the whey of cheese products, chocolates based liquids, and other foodstuffs which are initially liquid and then solidify.

The transport process can move reactants and attributes of one of the reactants from one of the reactant plenums to the other reactant plenum.

Attributes within the scope of this application are the attributes of the reactant and include ionic charge (when used as a fuel cell), heat (when used as a heat exchanger), moisture content (when used as a humidifier), pressure (when used with a gas permeable membrane to allow gas to diffuse out of a liquid), concentration (when used to transport material from a substance having a first concentration to a substance with a different concentration), electrical charge, and other similar physical characteristics.

For example, the chemical reactor can move large amounts of heat from a first reactant plenum to a second reactant plenum. If this reactor is made as a heat exchanger having hot water at about 90 degrees Celsius on one side and cold water at about 20 degrees Celsius on the other side, the reactor can quickly perform a thermal transfer of hot into cold in a short time.

When used as a fuel cell, fuel is filled in one reactant plenum and oxidant in the other. The fuel and oxidant are able to be transported to be in contact with the process layers. The process layers have anodes and cathodes by filling the cavities with electrochemically active materials. Electricity is produced by the fuel cell reactant and is transported out of the fuel cell through conductive paths in the layer structure. Water and heat are produced as bi-products of the reaction. The water is transported out of the cavities back into the reactant plenum and heat dissipates through the physical structure.

When used as an electrolyzer, anodes and cathodes are formed on either side of some of the process layers by at least partially filling the cavities with electrochemically active materials. Water is used to fill reactant plenums and is transported into the electrolyzer to come into contact with the anodes and cathodes at the process layers. The electrolysis reaction uses electrical energy to decompose water into water's constituent elemental components, i.e. hydrogen and oxygen. The constituent elemental components are formed at the electrodes and then are transported back into the reactant plenums by convection, diffusion, pressure gradients or a variety of other transport processes.

The compact chemical reactor can be formed in to a micro-structured fuel cell layer or a micro-structured electrolyzer layer.

A typical compact chemical reactor has an overall length between about 1 centimeter and about 100 centimeters; a preferred example is between 1 centimeter and 10 centimeters. An overall width of the chemical reactor is between 1 millimeter and 50 centimeters, with a preferred example being between 5 millimeters and 80 millimeters. An overall thickness between the front face and the back face of the compact chemical reactor is between about 100 nanometers and about 5 centimeters.

The compact chemical reactor provides high surface area process layers which are in communication with the reactant plenums through the front or back cavities. The front or back cavities have high aspect ratio's, wherein the distance from the front or back face to the opposite side of the cavity is much larger than the height of the front or back perimeter barrier.

The reactor preferably has an aspect ratio of at least one cavity >1 cm/cm, more preferably between 1 cm/cm and 100 cm/cm, and most preferably between 2.5 cm/cm and 15 cm/cm.

In operation reactants move from the reactant plenums into the front or back cavities of the unit reactors to come into contact with the process layers. In a preferred embodiment the reactants move in and out of the cavities through diffusion only. In an alternative embodiment, the reactants transport into and out of the cavities is aided by forced convection or by the forced flow through a microstructure embedded within at least one of the front or back cavities.

If the reactor with frames acts as a fuel cell, at least one process layer must be an ionically conductive process layer in order to facilitate the transport of ions. Optionally, at least one process layer may be made an electrically conductive process layer to transport electrons between unit reactors. An ionically conductive process layer can be made from a proton exchange membrane, an electrolyte filled micro-porous structure, a liquid electrolyte trapped in a mesh, and combinations thereof. An electronically conductive process layer can be made from an electrical conductor, a filled metal composite, a filled micro-structure of polymer, a filled epoxy composite, a graphite composite, or combinations of these materials.

Figure 7:
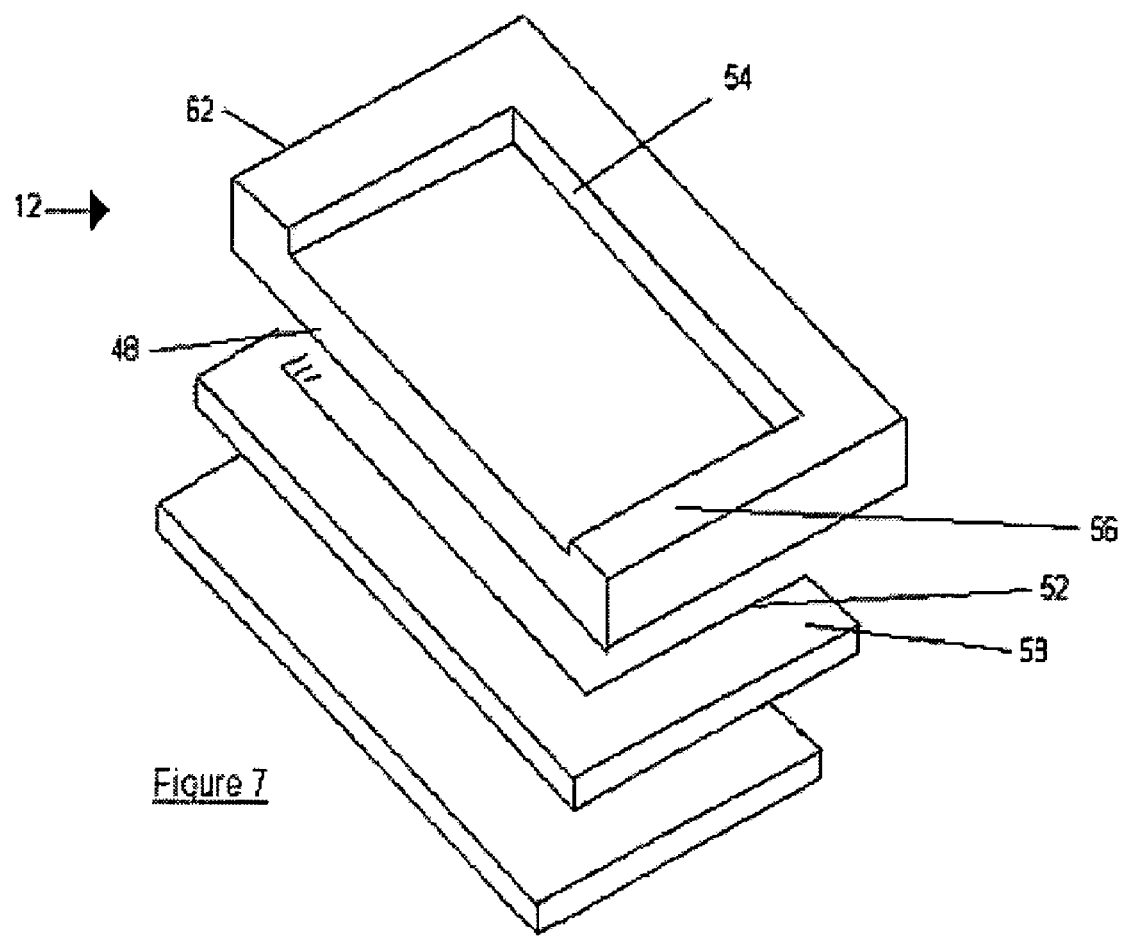
FIG. 7 depicts an exploded perspective view of a unit reactor with one frame.

Each unit reactor can be made of one or more reactor frames (62) as shown in FIG. 7. The frames can be made of one material, so that the frames can function as both a perimeter barrier and as a process material.

The frames that are made from a single material can be made by stamping, embossing, ablating, machining, molding, casting, water jet cutting, or otherwise gouging, or chemically etching. Typical materials are stainless steel; Nafion™, a composite, a metal filled composite, electrolyte filled composites, or combinations of these.

The frames can selectively be made porous and used in conjunction with the reactors.

Preferably, the frames are the same dimension as the components of the unit reactor which they replace. In the case of a compact chemical reactor used as a fuel cell, two types of frames can be used on the fuel cell, an electronically conducting frame and an ionically conducting frame. The electronically conducting frame is made from an electronically conducting material or alternatively, is made conductive by filling a porous region with a nonporous conductive material. The ionically conductive frame is made from an ionic conductor, such as Nafion™ from DuPont, and if Nafion™ is used, then the perimeter barrier if also formed from Nafion™. Alternatively, the frame material can be made from electrically insulating material such as polyethylene with a porous region that has been filled with electrolyte such as Nafion™ to render the region ionically conductive. The frames can be made of identical materials or the frame can each have a different material.

The frames are typically one piece structures to advantageously reduce the number of parts. The one piece construction makes aligning the unit reactors of the compact chemical reactors simpler, which, in turn, makes the process cheaper and quicker than construction using layered materials. By using a one piece formed construction of frames, there is no need for the extra step of bonding dissimilar materials together such as bonding perimeter barrier material to process layer material. Thus a compact chemical reactor built using frames will have better integrity and fewer maintenance issues than multipart constructions.

FIG. 7 depicts an exploded perspective view of a unit reactor with one frame. Frame (62) serving as a process layer (48) and as a perimeter barrier (56) with a formed cavity (54).

Figure 8:
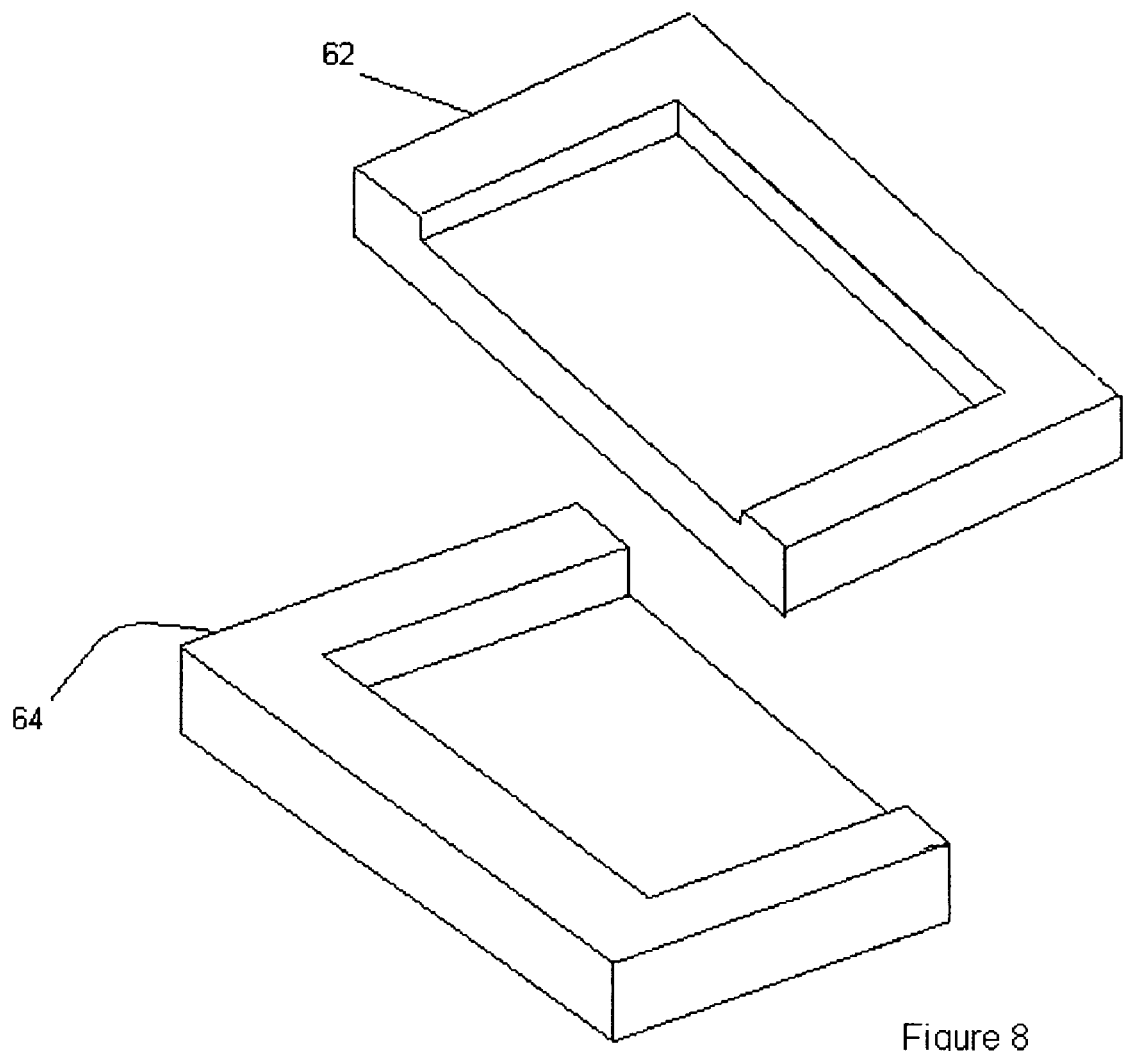
FIG. 8 depicts an exploded perspective view of a unit reactor with two frames.

FIG. 8 depicts an exploded perspective view of a unit reactor constructed from two frames (62 and 64). Each frame serves as a process layer and as a perimeter barrier and contains a formed cavity. The two process layers can have different functions in this embodiment, for example the first process layer can serve to be electrically conductive and the second process layer can serve to be electrically insulating. When used as a fuel cell, at least one frame is preferably made ionically conductive by either forming the frame from an ionic conductor or rendering a portion of a non-conducting frame ionically conductive.

Figure 9:
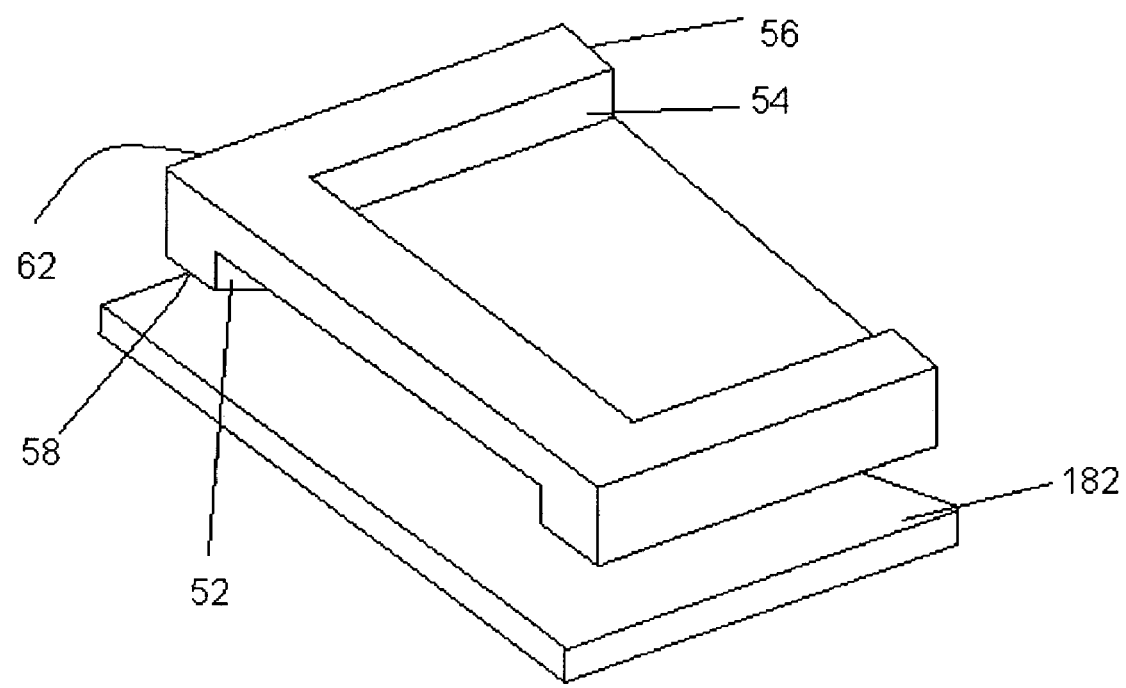
FIG. 9 depicts a unit reactor with a frame and two cavities.

FIG. 9 is a perspective view of a unit reactor with frame (62), a first cavity (52), and a second cavity (54). The cavities are surrounded by integral perimeter barriers (56 and 58). The unit reactor is completed by joining the frame (62) to a second process layer (182).

Figure 10:
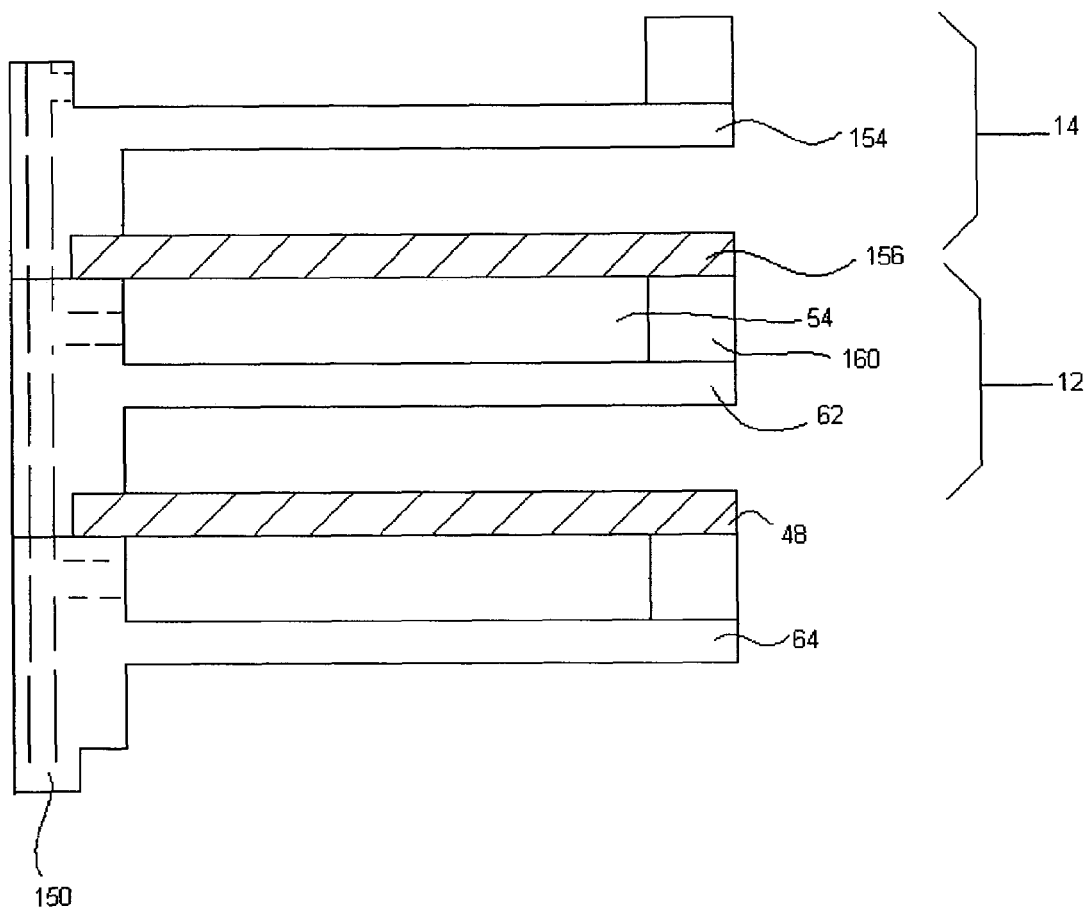
FIG. 10 depicts two unit reactors with an embedded plenum and three frames.

FIG. 10 shows a cross-sectional view of a compact chemical reactor with two unit reactors (12 and 14) and a portion of a reactant plenum (150) embedded in three frames (62, 64, and 154). In this embodiment, the two unit reactors are connected by the frames (62 and 64) and the back perimeter barrier (160). The notion of a common plenum on one side of the compact chemical reactor advantageously enables one reactant to be fed in a controlled manner while the other reactant plenum is open to the environment.

Figure 11:
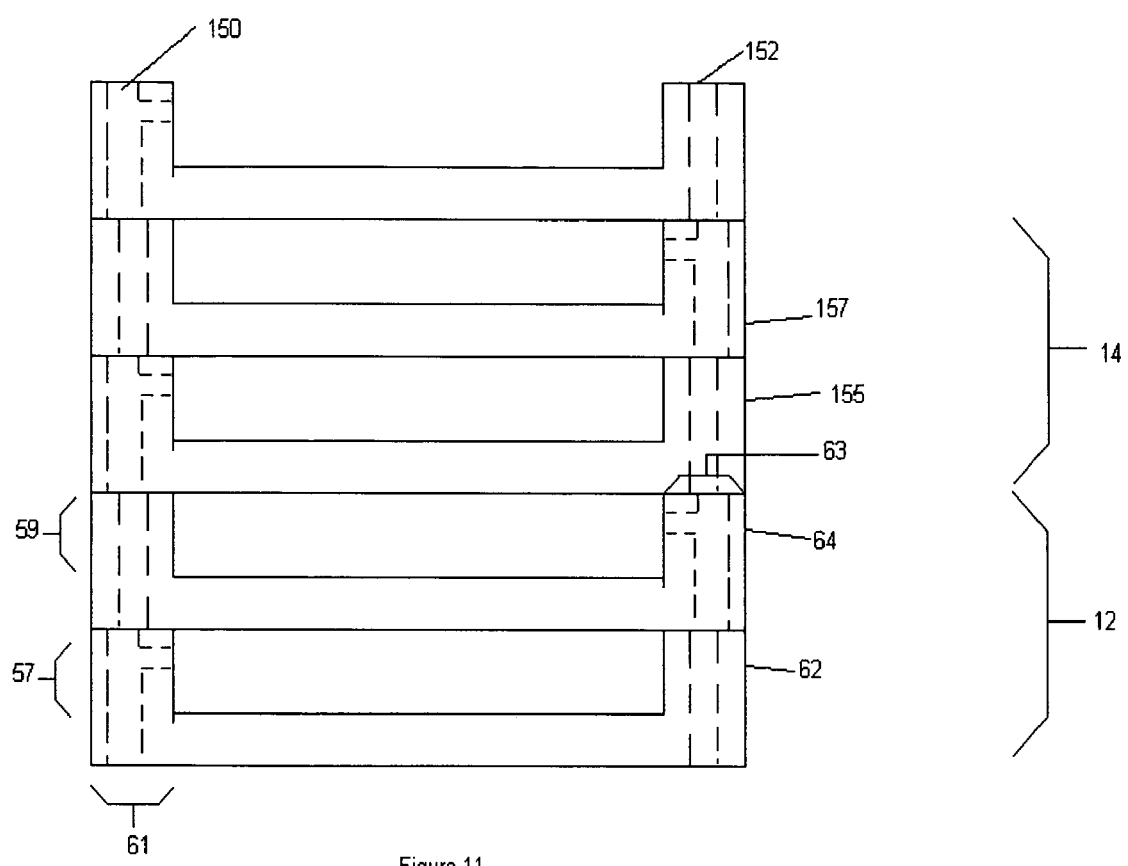
FIG. 11 depicts two unit reactors with two frames.

FIG. 11 shows an embodiment of two unit reactors (12 and 14), each with two reactor frames (62, 64, 155 and 157). The reactor frames can be used to house or embed one or more of the reactant plenums. This figure also depicts a portion of the two reactant plenums (150 and 152) embedded in each reactor frame (62, 64, 155, and 157) similar to FIG. 10.

FIG. 11 also shows that the perimeter barriers used on the process layers of the unit reactors have dimensions of height and width. The front and back perimeter barrier height (57 and 59) respectively have a preferred dimension ranging from about 100 nanometers to about 10 millimeters. The front and back perimeter barrier width (61 and 63) respectively have a preferred dimension ranging from about 10 nanometers to about 5 millimeters. In still another embodiment, the front and back perimeter barrier widths can vary, being less on one portion of the perimeter barrier and greater on another portion of the perimeter barrier.

Figure 12:
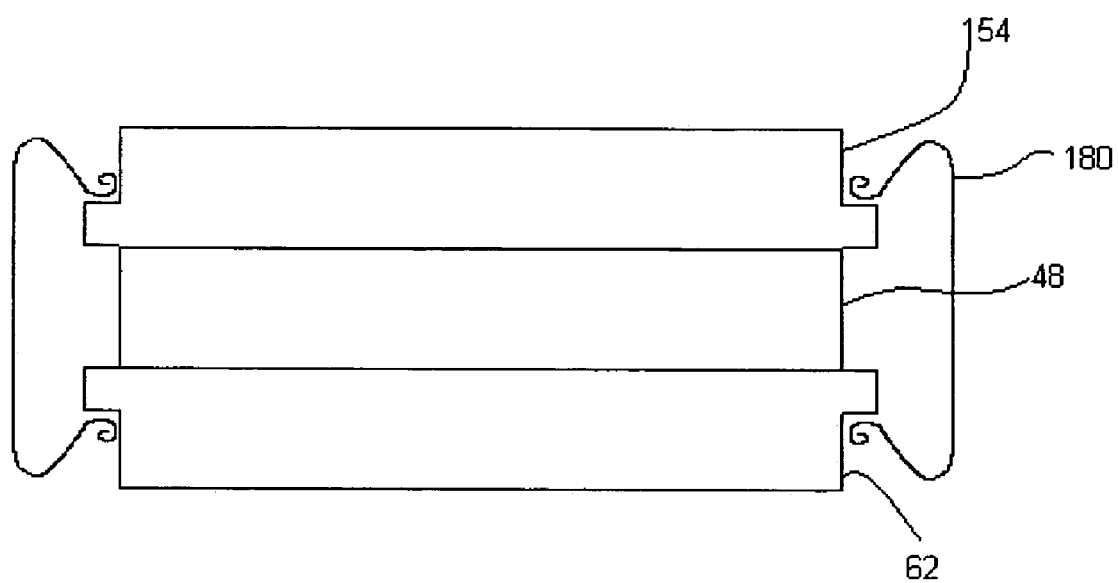
FIG. 12 depicts a view of a reactor frame with mechanical fasteners.

FIG. 12 depicts an exploded perspective view of a reactor frame with a mechanical fastener. Each unit reactor can be formed from two or more reactor frames. FIG. 11 depicts the embodiment of two unit reactors (12 and 14), each with two reactor frames (62, 64, 155 and 157). The reactor frames can be used to house or embed one or more of the reactant plenums.

Examples of mechanical devices usable to connect the unit reactors include snap fit connections, mechanical clips (180) (depicted in FIG. 12), tie rods, adhesive bonds, tape, external compression bands, keys, and combinations of these mechanical devices. The reactor frames can be held together by a protrusion and the corresponding indentation formed from the frame material, or the frame on each unit reactor can be integrally formed to corresponding with another unit reactor.

Figure 13:
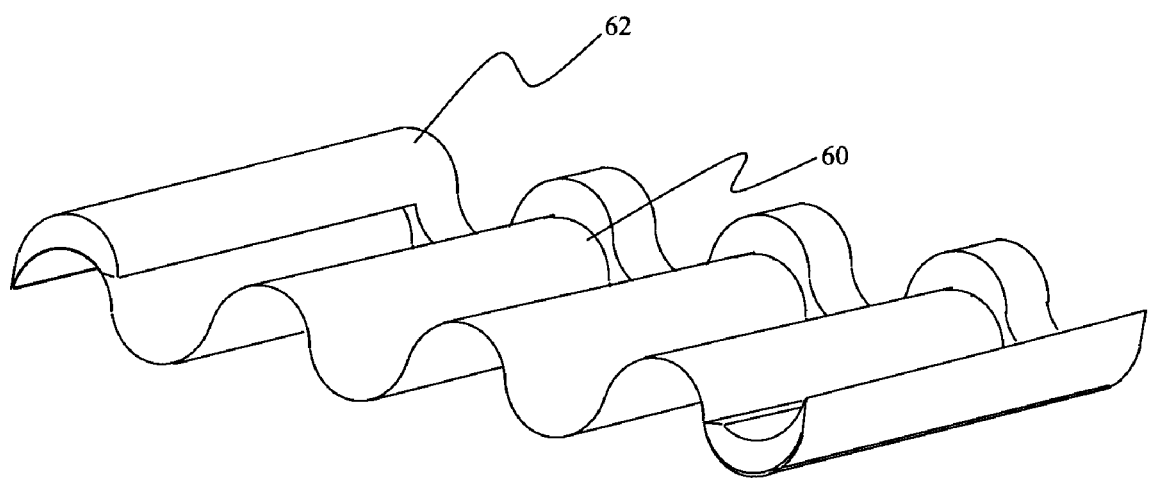
FIG. 13 depicts an undulating reactor with frames.

FIG. 13 shows a frame (62) with an undulating process layer (60). The surface area of the process layer is increased with the undulating construction, thereby increasing the capacity of the compact chemical reactor for the amount of reaction that can be done.

Undulating in the context of this application refers to non-planar process layers, such as layers which are sinusoidal in shape, or arcs, or irregular in some other manner. It is contemplated that some of the process layers can be undulating while remaining process layers can be planar and still form a usable compact chemical reactor.

The compact chemical reactor can be a fuel cell layer formed from multiple unit reactors, each of which is a unit fuel cell with a frame.

Figure 14:
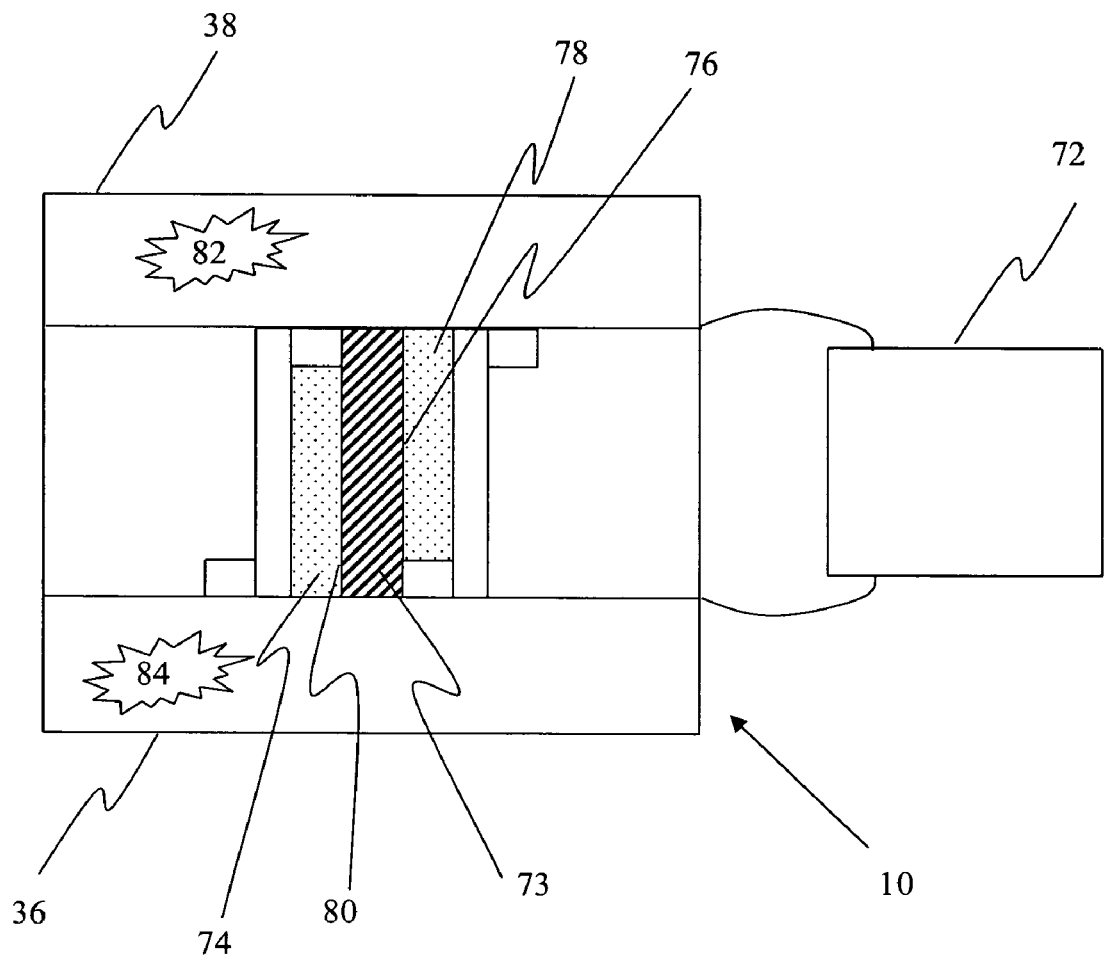
FIG. 14 depicts a compact chemical reactor with an electrical appliance.

FIG. 14 depicts an embodiment wherein the compact chemical reactor (10) is a frame based fuel cell layer is used in conjunction with an electrical appliance (72). The electrical appliance (72) uses the compact chemical reactor (10) as a source of electrical power.

In this embodiment, the unit fuel cell each comprises one or more process layers of electrolyte (73). One or more of the cavities include a first catalyst (74) forming at least one anode (80). One or more other cavities include a second catalyst (78) forming at least one cathode (76). The anode (80) and the cathode (76) are disposed on either side of the electrolyte (73). The frame (62) serves as a separator between unit fuel cells as well as forming the two perimeter barriers (56 and 58)

One of the reactant plenums (38) contains an oxidant (82), such as oxygen, and the other reactant plenums (36) contain a fuel (84), such as hydrogen. The anode (80) and the cathode (76) connect to the electrical appliance and provide power.

The embodiments have been described in detail with particular reference to certain preferred embodiments thereof, but it will be understood that variations and modifications can be effected within the scope of the embodiments, especially to those skilled in the art.

What is claimed is:

1. A chemical reactor having a first face and a second face, the reactor comprising at least two reactor units disposed adjacent one another, wherein each reactor unit comprises:
    a first process layer;
    a second process layer;
    a first perimeter barrier disposed between the first and second process layers, wherein the first perimeter barrier and the first and second process layers are arranged to define a first cavity, the first cavity having a portion opening onto the first face;
    a second perimeter barrier disposed between the second process layer and a first process layer of an adjacent reactor unit, wherein the second perimeter barrier, the second process layer, and the first process layer of the adjacent reactor unit are arranged to define a second cavity, the second cavity having a portion opening onto the second face; and
    wherein one of the first or second process layer is coupled with at least one of the first or second perimeter barrier to form a frame.

2. The chemical reactor of claim 1, wherein the second process layer is coupled with both the first and second perimeter barriers to form the frame.

3. The chemical reactor of claim 1, wherein the first perimeter barrier is coupled with the first process layer to form a first frame, and the second perimeter barrier is coupled with the second process layer to form a second frame.

4. The chemical reactor of claim 1, wherein the first or second process layer and the first or second perimeter barrier coupled thereto to form the frame comprise the same material.

5. The chemical reactor of claim 1, wherein the frame comprises a one piece structure.

6. The chemical reactor of claim 1, wherein the first and second perimeter barriers are substantially impermeable to one or more reactant used in operation of the chemical reactor.

7. The chemical reactor of claim 1, wherein the first cavity is arranged to receive a fuel from a first reactant plenum.

8. The chemical reactor of claim 7, wherein the at least two reactor units surround and define a shape of the first reactant plenum.

9. The chemical reactor of claim 7, wherein a portion of the frame is integral with a portion of the first reactant plenum.

10. The chemical reactor of claim 7, wherein the second cavity is arranged to receive an oxidant from a second reactant plenum or ambient air.

11. The chemical reactor of claim 10, wherein the first and second process layers are configured to permit a transport process between the first and second reactant plenums.

12. The chemical reactor of claim 1, wherein an outward orientation of the first face is substantially opposite an outward orientation of the second face.

13. The chemical reactor of claim 1, wherein the first and second faces are substantially planar and parallel to one another.

14. The chemical reactor of claim 1, wherein the chemical reactor comprises a substantially planar construction having a thickness between 1 nanometer and 2 centimeters.

15. The chemical reactor of claim 1, wherein the at least two reactor units are orthogonally disposed around a central axis.

16. The chemical reactor of claim 1, wherein the at least two reactor units are disposed parallel to a central axis.

17. The chemical reactor of claim 1, wherein the at least two reactor units comprise an annular shape.

18. The chemical reactor of claim 1, wherein the at least two reactor units comprise a first reactor unit and a second reactor unit, and wherein the frame of the first reactor unit is coupled to the frame of the second reactor unit using a mechanical device.

19. The chemical reactor of claim 1, wherein the first and second process layers are configured to permit a transport process between the first and second cavities.

20. The chemical reactor of claim 1, wherein the first process layer is configured to perform a function different than a function of the second process layer.

21. The chemical reactor of claim 1, wherein at least one of the first or second process layer comprise more than one material.

22. The chemical reactor of claim 1, wherein at least one of the first or second process layer comprise an ionically conductive process layer.

23. The chemical reactor of claim 1, wherein at least one of the first or second process layer comprise an electrically conductive process layer.

24. The chemical reactor of claim 1, wherein the first and second cavities are at least partially filled with a porous media.

25. The chemical reactor of claim 1, wherein a height of the first cavity, defined by a distance between the first and second process layers, is less than a depth or a width of the first cavity.

26. The chemical reactor of claim 25, wherein a height of the second cavity, defined by a distance between the second process layer and the process layer of the adjacent reactor unit, is less than a depth or a width of the second cavity.

27. The chemical reactor of claim 26, wherein the first and second cavities differ in at least one of their corresponding height, depth, or width dimensions.

28. The chemical reactor of claim 26, wherein at least one of the height, depth, or width of the first or second cavity varies within the respective cavity.

29. A chemical reactor having a first face and a second face, the reactor comprising at least two reactor units disposed adjacent one another, wherein each reactor unit comprises:
- a first process layer;
- a second process layer;
- a first perimeter barrier disposed between the first and second process layers, wherein the first perimeter barrier and the first and second process layers are arranged to define a first cavity, the first cavity having a portion opening onto the first face;
- a second perimeter barrier disposed between the second process layer, and a first process layer of an adjacent reactor unit, wherein the second perimeter barrier, the second process layer, and the first process layer of the adjacent reactor unit are arranged to define a second cavity, the second cavity having a portion opening onto the second face, wherein the first cavity and the second cavity are configured to separate reactants received by the first cavity from reactants received by the second cavity; and
- wherein one of the first or second process layer is coupled with at least one of the first or second perimeter barrier to form a frame.

* * * * *

UNITED STATES PATENT AND TRADEMARK OFFICE
CERTIFICATE OF CORRECTION

PATENT NO. : 7,560,077 B2
APPLICATION NO. : 11/433014
DATED : July 14, 2009
INVENTOR(S) : Lam et al.

It is certified that error appears in the above-identified patent and that said Letters Patent is hereby corrected as shown below:

In column 5, line 31, delete "polyvinyldiflouride," and insert -- polyvinyldifluoride, --, therefor.

In column 9, line 22, delete "58)" and insert -- 58). --, therefor.

In column 12, line 2, in Claim 29, delete "layer," and insert -- layer --, therefor.

Signed and Sealed this

Sixth Day of October, 2009

David J. Kappos
*Director of the United States Patent and Trademark Office*